Figure 1:
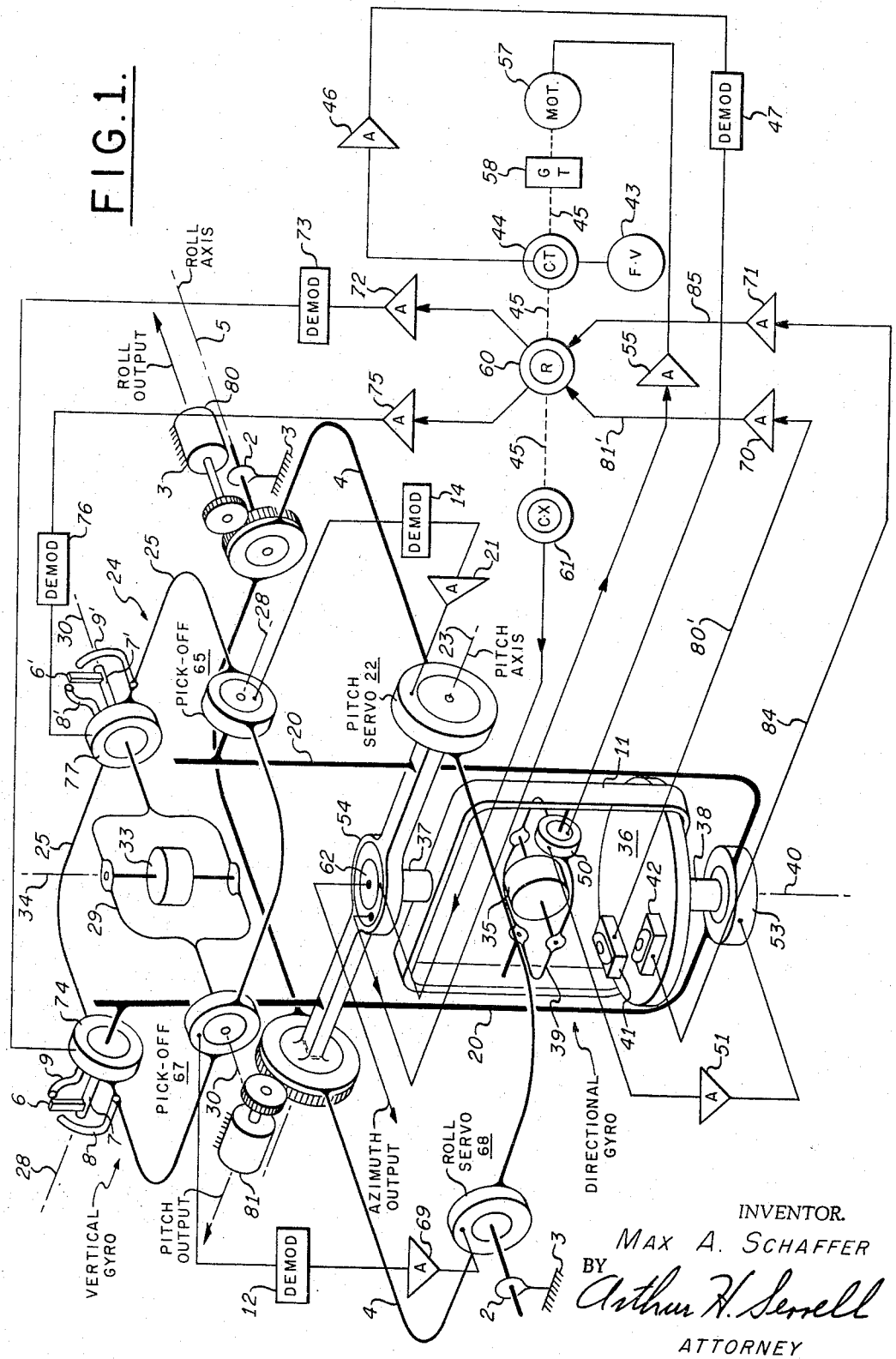

3,329,028
GYROSCOPIC ALIGNMENT SYSTEM

Max A. Schaffer, Huntington, N.Y., assignor to Sperry Rand Corporation, Great Neck, N.Y., a corporation of Delaware
Filed Oct. 22, 1964, Ser. No. 405,778
13 Claims. (Cl. 74—5.41)

This invention relates to a means for aligning the related normally vertical axes of the gimbal ring of a directional gyro and the spin axis of the rotor of a gyro vertical under start-up conditions of operation of a stable platform of the character described in my copending application for U.S. Letters Patent, Ser. No. 261,005, filed Feb. 26, 1963.

The platform structure shown in the drawing of the noted application provides means for mounting the directional gyro and the gyro vertical on a dirigible craft that includes a first gimbal having an axis corresponding to the roll axis of the craft, and a second gimbal carried by the first gimbal having an axis corresponding to the pitch axis of the craft. The gyro vertical of the platform includes a gimbal that is carried by the second mounting gimbal, a rotor frame carried by the gyro vertical gimbal and a gyroscopic rotor spinning about a normally vertical axis. The ring of the directional gyro is carried by the second mounting gimbal with its axis normally in alignment with the vertical axis of the rotor of the gyro vertical. The gyroscopic rotor of the directional gyro spins about a normally horizontal axis that is perpendicular to the normally horizontal axis of the rotor frame carried by the ring. The described system operates after completion of the start-up operation to provide gyroscopic stabilization for the platform with respect to the craft about orthogonal axes such as the roll, pitch and azimuth axes of the craft.

An object of the invention is to provide a start-up conditioning means for a system of the character described that operates automatically to align the axes of the noted gyroscopic components within a predetermined relatively short period of time.

One of the features of the invention resides in the erecting means included in the system for the gyro vertical. This structure includes angularly spaced stops between the gyro vertical gimbal and mounting gimbal that engage during the start-up operation to exert a torque about the axis of the gyro vertical gimbal, and angular spaced stops between the gyro vertical gimbal and the frame of the gyro vertical that engage during the start-up operation to exert a torque about the axis of the gyro vertical frame. Here, the angular displacement between the stops is relatively small and as the conditioning means operate, one or the other of the pairs of stops are engaged to precess the frame of the gyro vertical so that the axis of the gyroscopic rotor moves to an approximately vertical condition in two steps respectively over an initial time period and over a subsequent time period.

In the first of the operating stages of the conditioning means, two of the stops are initially engaged to begin the precession operation by the provision of an input to a servo connected to move the second of the mounting gimbals about its axis. Here the first of the mounting gimbals is locked with respect to the craft by means that is effective for this purpose for only the initial time period of operation of the start-up conditioning means, and the input to the second gimbal servo is determined as the difference between the angle of tilt of the vertical ring of the directional gyro about the axis of the second mounting gimbal and an inverted value of the relative tilt between the gimbal of the gyro vertical and the second mounting gimbal.

In the second of the operating stages of the conditioning means, the locking means for the first mounting means is freed, the stops are engaged by an input to the servo for the second mounting gimbal that is determined as the difference between the relative tilt between the gimbal of the gyro vertical and the second mounting gimbal and the angle of tilt of the axis of the ring of the directional gyro.

Figure 2:
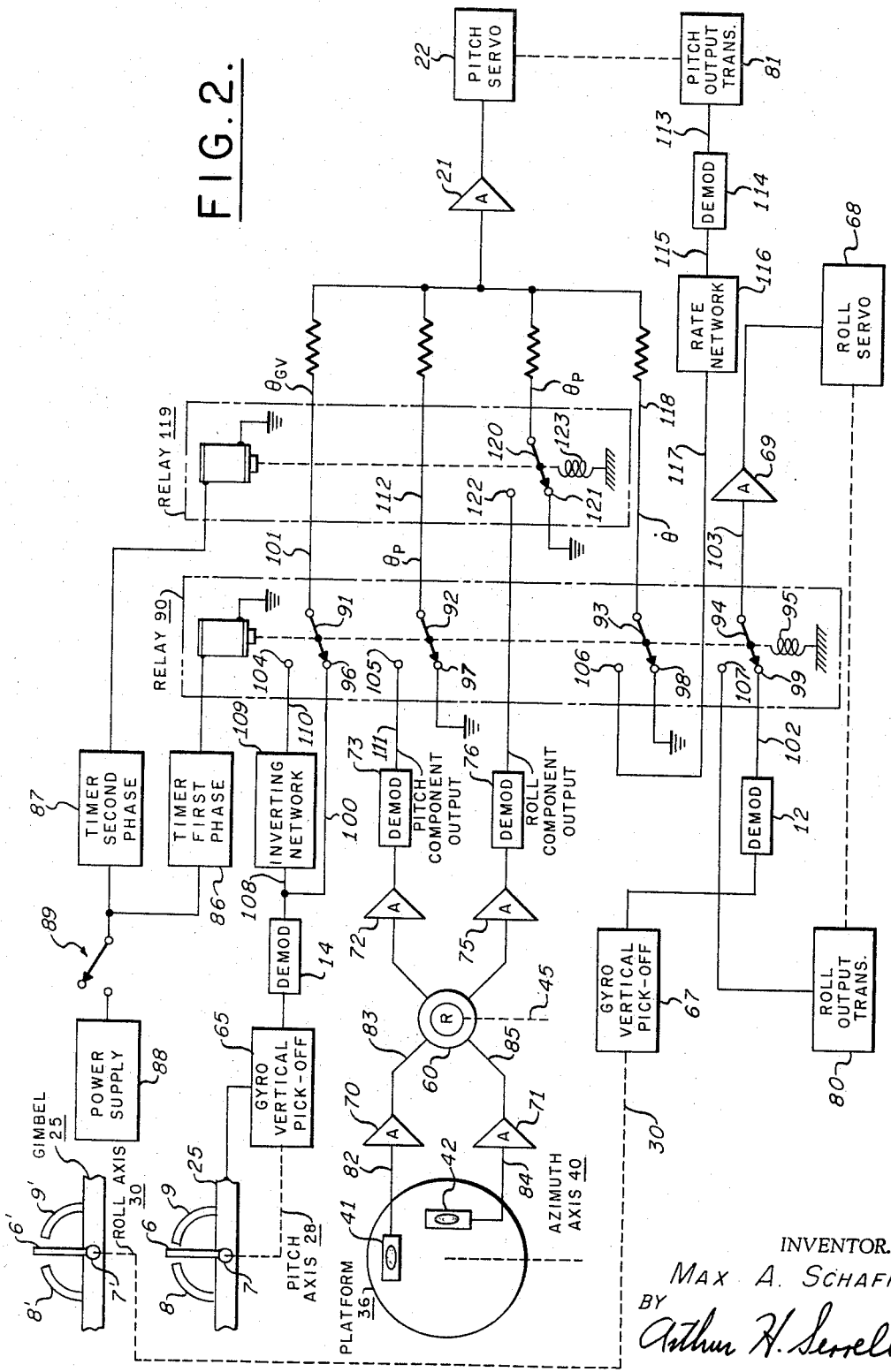
Figure 3:
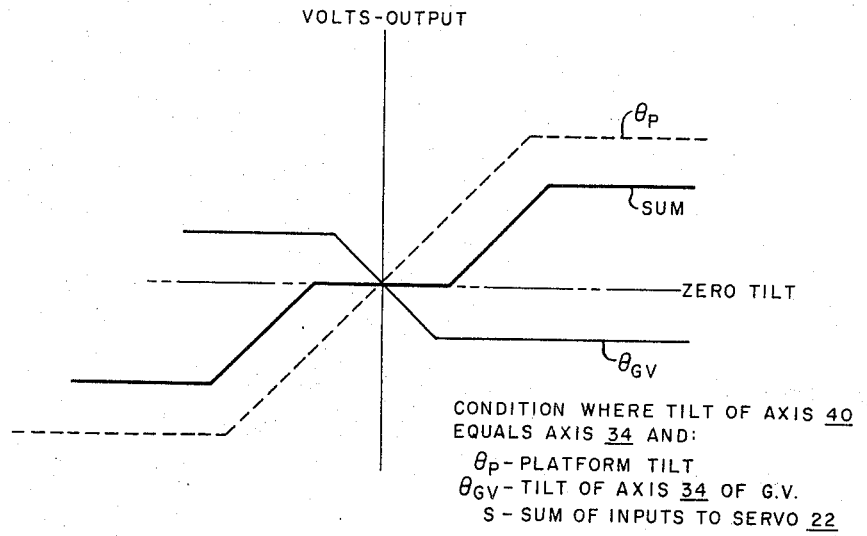
Figure 4:
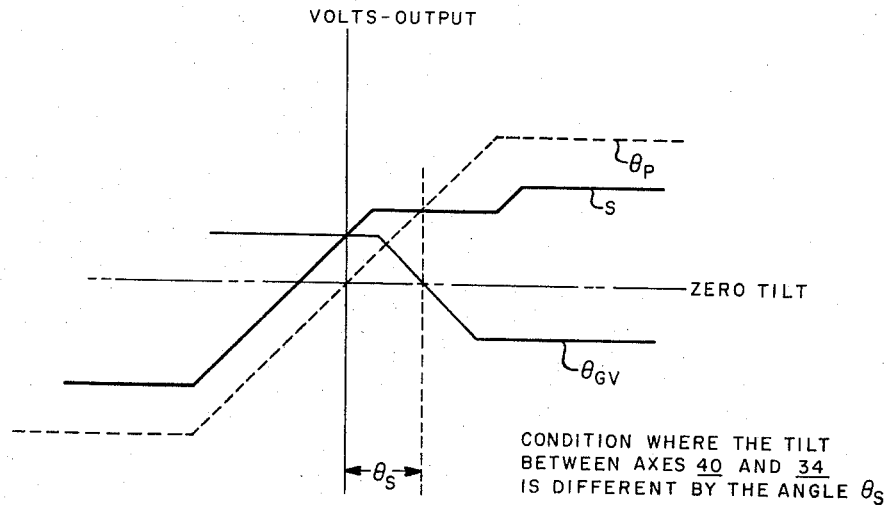

Other objects, features and structural details of the improved alignment conditioning means will become apparent from the following description of the invention in relation to the accompanying drawings in which:

FIG. 1 is a schematic perspective view of a stabilizing system that includes erecting stops of the improved start-up conditioning means, FIG. 2 is a schematic view and wiring diagram of the improved system, and FIGS. 3 and 4 are graphs that compare the tilt conditions of the spin axis of the rotor of the gyro vertical and the axis of the ring of the directional gyro.

The components of the stabilization system shown in the hereinbefore noted pending application include airframe or craft 3, a first gimbal 4 carried by the craft through bearings 2—2 for movement about a normally horizontal axis 5. In the arrangement shown axis 5 corresponds to the roll axis of the craft and the gimbal 4 is movable about this axis and may be referred to as the servoed roll gimbal. Gimbal 4 provides one of the parts of a mounting means whose other part is provided by gimbal 20 which is carried by the gimbal 4 to move about a normally horizontal axis 23. The axis 23 being perpendicular to the axis 5 of the gimbal 4 normally corresponds to the pitch axis of the craft and may be referred to as the servoed pitch gimbal. As further shown in FIG. 1, the vector arrow designated roll output represents angular departures of the craft from a level condition with respect to axis 5 and an output from a roll output transmitter 80 whose stator is fixed to the craft and whose rotor is connected through suitable gearing to the gimbal 4. The roll servo element 68 of the system is an electric motor one of whose parts are fixed to the gimbal 4 and the other of whose parts are fixed to the craft. The like components shown in FIG. 1 for the pitch axis 23 of the system include pitch output transmitter 81 and pitch servo 22. In the arrangement shown, gimbal 20 moves about axis 23 with respect to gimbal 4, and the respective stators and rotors of the transmitter 81 and servo 22 are fixed to the gimbal 4 and connected to the gimbal 20. The vector arrow noted as pitch output represents angular departure of the craft from a level condition with respect to axis 23.

The stabilizing means included in the system is provided by a gyro vertical and a directional gyro. The conventional gyro vertical structure shown includes a gimbal 25 carried by the second mounting gimbal 20 with an axis 28 fixedly in parallel correspondence to the axis 23 of gimbal 20.

The rotor frame 29 of the gyro vertical structure is carried by gimbal 25 with freedom about a horizontal axis 30 corresponding to the axis 5 of the gimbal 4. The gyroscopic rotor 33 of the frame 29 spins about a normally vertical axis 34 through the influence of a suitable driver such as an electric motor (not shown).

In the improved system, the gyro vertical includes erecting means in the form of pairs of stops located at the respective axes 28 and 30. This structure is provided by relatively rigid and resilient parts with an angular limiting displacement range therebetween of approximately plus or minus one degree before engagement for axis 28, and approximately plus or minus 15 degrees before engagement for axis 30. For axis 28, the resilient stop is a flat spring 6 that is anchored at one end to a pin 7 fixed to the gimbal 20. Spring 6 extends radially of the axis 28 from the pin 7. The rigid stop structure is provided two curved pieces 8 and 9 that are fixedly mounted on the gimbal 25 at one end. The other end of the pieces 8 and 9 include oppositely disposed faces that engage with the sides of the spring 6 in operation of the system under start-up conditions. A similar stop structure is provided for axis 30, where the resilient part is a flat spring 6' connected to the trunnion 7' of rotor frame 29. The rigid parts 8' and 9' of this stop structure are fixedly connected to gimbal 25. The stops for axis 28 are arranged to engage and exert a torque about axis 28 to precess the frame 29 about axis 30 when the angular relation between gimbal 20 and gimbal 25 depart from a normally mutually perpendicular relation by more than the plus or minus one degree displacement angle permitted between the parts. A similar result is provided by the stops for the axis 30 when the angular relation between the rotor axis and gimbal 25 departs from a normally mutually perpendicular relation by the stated ±15° displacement. In the normal operation of the system, the described erecting means is normally ineffective. When rendered effective during start-up operations of the system, the stops of the erecting means operate alternatively depending on the angular-relation between gimbal 20, gimbal 25 and frame 29 so that the axes 28, 30 and 34 are mutually perpendicular at the completion of the operation with axis 34 vertical and aligned with the axis 40 of the vertical ring 11 of the directional gyro of the system.

The third stabilization axis of the system is provided by the directional gyro. As shown in FIG. 1, the vertical ring 11 of the directional gyro is carried by the second gimbal 20 by trunnion connections 37, 38. The rotor frame of the directional gyro structure is indicated at 39, the frame being carried by the ring 11 with freedom about a normally horizontal axis. The gyroscopic rotor carried by the frame 39 is indicated at 35. In operation of the system, the rotor 35 spins about a normally horizontal axis perpendicular to the horizontal frame axis. Suitable means such as an electric motor (not shown) is provided to drive the rotor 35.

As shown in FIG. 1, the ring 11 of the directional gyro is mounted on the portion of the gimbal 20 on the side of axis 23 opposite to the gyro vertical. The ring 11 is stabilized in pitch and roll by the gyro vertical when the system is operating normally and is further slaved in azimuth to a suitable azimuth reference. In the system described, the directional gyro is slaved in azimuth with its rotor 35 spinning about a normally horizontal axis directed in a North-South direction. Ring 11 further includes a platform 36 having a pair of sensors in the form of liquid levels 41 and 42 mounted thereon in mutually perpendicular relation where level 41 is directed North-South and level 42 is directed East-West. Since the relation about axis 40 between ring 11 and gimbal 20 changes depending on the heading of the craft, the system includes a resolving means 60. Tilt of the axis 40 of the ring 11 from a vertical condition is resolved with relation to the pitch and roll axes of the craft. As shown, the tilt output of sensor 41 is fed to resolving means 60 by way of lead 80', amplifier 70 and lead 81'. Also, the output of the complementing sensor 42 is fed to the resolving means 60 by way of lead 84, amplifier 71, and lead 85. The described tilt sensors also respond to the influence of acceleration thereon in the horizontal North-South and horizontal East-West directions.

The means shown in FIG. 1 for slaving the directional gyro of the system in azimuth further includes a flux valve 43 or other azimuth reference. As shown, valve 43 is connected to a control transformer 44 whose rotor is fixed to shaft 45. The stator of transformer 44 provides an output that is amplified in an amplifier 46, demodulated in a demodulator 47 and then transmitted to the torquer portion of a combined pick-off and torquer 50 at the frame axis of the directional gyro. The combined pick-off and torquer 50 may be of the type shown in U.S. Patent 3,089,044 assigned to the same assignee as the present invention. A torque about the axis of frame 39 results in precession of the ring 11 about axis 40 to provide an output from a control transformer 54 that is dependent on the position of the ring 11 in azimuth in relation to gimbal 20. In the slaving and follow-up system shown in FIG. 1, the output of transformer 54 which represents the positional difference between the azimuthal position of vertical ring 11 and position of azimuth follow-up transmitter 61 is amplified in an amplifier 55 and fed to motor 57 to drive the azimuth follow-up shaft 45 through gear train 58 and move the rotor of flux valve transformer 44, the rotor of resolving means 60 and the rotor of synchro transmitter 61 whereby to slave the gyro to the magnetic meridian in a generally conventional manner. In the system arrangement shown in FIG. 1, the rotor of transmitter 62 is fixed to the ring 11 of the directional gyro and the transmitter 62 provides an azimuth output as indicated by the designated vector arrow that is dependent on the heading of the craft in the earth's magnetic field. In the described system, the spin axis of the rotor 35 of the directional gyro is maintained horizontal by means of an output from the pick-off portion of torquer 50 that is fed to torquing means 53 by way of amplifier 51.

The normally effective means for erecting the rotor 33 of the gyro vertical so that its spin axis 34 is vertical is provided by the tilt sensors or liquid levels 41 and 42 on platform 36. As shown in this respect in FIG. 1, the stator of the resolving means 60 feeds the pitch component of the platform tilt to a torquing means 77 at the axis 30 of the gyro vertical by way of amplifier 75 and demodulator 76. The roll component of the platform tilt from means 60 is fed to a torquing means 74 at the axis 28 of the gyro vertical by way of amplifier 72 and demodulator 73. The system is normally horizontally stabilized by the gyro vertical through means of a pick-off 67 whose output is fed to roll servo 68 for the mounting gimbal 4 by way of amplifier 69 and demodulator 12. Also, pick-off 65 of the gyro vertical provides a stabilizing output for the pitch servo 22 by way of amplifier 21 and demodulator 14. The system functions normally with a null output from pick-offs 65 and 67, the platform 36 level, and the ring 11 directed in azimuth according to the flux valve 43 and independent of the heading of the craft.

At start-up, the rotors 33 and 35 are at rest, the axis 34 probably is not aligned with the axis 40 and there may be relative tilt between the gimbals 25 and 4 with respect to one another as well as with respect to the craft. Also, the angular relation between the pitch gimbal 20 and the gimbals 4 and 25 may be other than mutually perpendicular. In the start-up operation, the normally effective stabilizing means shown in FIG. 1 for the system are rendered ineffective and the components are conditioned as represented in FIG. 2. The following elements shown in FIG. 1 in detail are included in the FIG. 2 wiring diagram, the stops 6–6', 7–7, and 9–9' of the erecting means of the gyro vertical, pick-off 65, platform 43, tilt means 41, 42, pick-off 67, transmitter 80, resolving means 60, amplifiers 70, 71, 72, 75, 21 and 69, demodulators 73, 76, 12 and 14, roll servo 68, transmitter 81, and pitch servo 22.

The start-up conditioning means provided is operative over a time period that assures that the rotors 33 and 35 have accelerated from standstill to substantially normal running speed. As shown in FIG. 2, the time period for the operation is separated into two phases by a first phase or initial timer 86 and a second phase or subsequent timer 87. The system is connected to a power supply 88 by a switch 89 to include the timer 86 and a relay 90 whose coil is energized for the duration of the first start-up phase. The ganged armatures 91, 92, 93 and 94 of relay 90 are normally biased by spring 95 in the position shown in FIG. 2 with armature 91 engaging contact 96, armature 92 engaging contact 97, armature 93 engaging contact 98, and armature 94 engaging contact 99. The engaged armature 91 and contact 96 of relay 90 close the normal slaving circuit between vertical gyro pitch pick-off 65 and the platform pitch gimbal servo 22 which includes demodulator 14, lead 100 to contact 96 and lead 101 to amplifier 21. Also, the engaged armature 94 and contact 99 close the normal slaving circuit between vertical gyro roll pick-off 67 and the platform roll gimbal servo 68 which includes demodulator 12, lead 102 to contact 99 and lead 103 to amplifier 69. The contacts 97 and 98 of the relay 90 are connected by suitable leads to ground during normal operation. The normally ineffective start-up means are rendered effective by the closure of switch 89 and the energization of the coil of the relay 90 for the initial time period to move armature 91 into engagement with contact 104, armature 92 into engagement with contact 105, armature 93 into engagement with contact 106, and armature 94 into engagement with contact 107.

In the first phase of the alignment operation at start-up, the erecting stops are rendered effective through operation of the pitch servo 22 and the roll servo 68 is rendered effective to lock the mounting gimbal 4 to the craft. bal transmitter 80 which is rendered effective when the armature 94 engages contact 107 to operate the servo 68 to null the output of the transmitter. In other words, since the stator of transmitter 80 is fixed to the craft, the roll attitude of the craft at start-up determines the null point for the operation of the servo 68 and the start-up position of the gimbal 4 during the initial phase.

Three inputs are provided for the pitch servo 22 during the initial start-up phase as provided by the respective engagements of armatures 91, 92 and 93 with contacts 104, 105 and 106. The first circuit closed by engagement of armature 91 and contact 104 connects the vertical gyro pitch pick-off 65 so that its output is fed to servo 22 by way of demodulator 14, lead 108, inverting network 109, lead 110 to the relay contact 104, lead 101 and amplifier 21. The output of the pick-off 65 is linear through a range that is greater than the limit angle between the erecting stops and is represented in FIGS. 3 and 4 by the curves designated as $\theta_{G.V.}$. The designated angle varies in accordance with the relative angular displacement of the gyro vertical pitch gimbal 25 and the second or platform pitch gimbal 20 from a normally perpendicular relation.

The second circuit closed by the engagement of armature 92 and contact 105 connects the resolving means 60 so that the pitch component of the output liquid level sensors 41, 42 is fed to the pitch servo 22. Here, amplifier 72, demodulator 73 are connected to contact 105 by lead 111 and lead 112 connects the armature 92 to the sum amplifier 21. The pitch component output of the liquid level sensors is linear over a greater range than that of the pick-off 65 as indicated in FIG. 3 and FIG. 4 by the curve $\theta_p$.

In this initial quick erection phase, the pitch servo 22 is driven by the pitch component of resolver 60 and the vertical gyro pitch pick-off signal thereby rendering the limit-stop erecting means effective by engagement of the parts 6 and 8 or 9 at axis 28. This engagement also precesses the rotor frame 29 about vertical gyro roll axis 30 toward the platform vertical axis 40. In the above operation, the output of the pick-off 65 in effect biases the servo 22 with the pitch stops engaged to drive the platform 36 on gimbal 20 from the condition shown in the curves in FIG. 4 to the condition shown in FIG. 3 where the tilt angles $\theta_p$ and $\theta_{G.V.}$ are equal and opposite. At this time, the input to the pitch servo 22 goes to zero and the gimbal 20 ceases to move, suitable damping being provided by a platform pitch rate signal developed by rate network 116 as described below. This first phase of the operation at start-up is completed with the roll gimbal 4 effectively locked to the craft and with the described components moving with relations to the gimbal 4 as a base.

The described operation in the initial time period is damped by the inclusion in the start-up conditioning means of a normally ineffective means for providing a damping input to the servo 22. As shown in FIG. 2, the damping means is rendered effective by a third circuit closed by the engagement of armature 93 and relay contact 106. Here, the pitch output transmitter 81 is connected to contact 106 by way of lead 113, demodulator 114, lead 115, rate network 116 and lead 117. Lead 118 between armature 93 and amplifier 21 feeds the servo 22 a pitch rate of change input indicated as $\dot{\theta}$.

At the completion of the initial operating phase of the start-up conditioning means, the timer 86 breaks the circuit to relay 90, and the spring 95 returns the armature 91, 92, 93, and 94 to engage the contacts 96, 97, 98 and 99 as shown in FIG. 2. As the timer 86 cuts out, the second phase timer 87 cuts in and establishes the duration of the subsequent time period or second start-up phase. At the completion of the second start-up phase, the timer 87 renders the start-up conditioning means ineffective.

Thus, during the initial phase of the quick erection operation, the platform 36 is erected in pitch to the gravity vertical 40. Although the roll gimbal 4 and hence the platform 36, during the initial phase is substantially properly aligned with the vertical (assuming a level aircraft), it will be recalled that the stops 6', 8' and 9' will allow the gyro vertical spin axis 34 to have any orientation in roll within their ±15° limits. Thus, if normal vertical gyro platform slaving only were to be established after the first phase, the platform 36 would not be quickly slaved to the vertical in roll. It is therefore the function of the second phase of operation to quickly remove any vertical gyro roll error and allow the platform 36 to be quickly erected in roll to the gravity vertical 40.

In the second start-up phase, the timer 87 energizes the coil of relay 119 to move armature 120 from contact 121 into engagement with contact 122. Spring 123 normally biases the armature 120 against the grounded contact 121. The engagement of armature 120 and contact 122 closes a circuit to demodulator 76 that provides a roll component output from the liquid level sensors 41, 42 on the platform 36 to the pitch servo 22. In this time period, the damping circuit for the servo 22 is rendered ineffective by the disengagement of armature 93 and contact 106. The second input to the servo 22 is provided by the engagement of armature 91 and contact 96 to connect the gyro-vertical pick-off 65 directly thereto. Disengagement of armature 94 from 107 renders the locking means for the gimbal 4 ineffective at the beginning of the second time phase. With armature 94 engaged with contact 99, normal slaving is provided between the gyro-vertical roll pick-off 67 and the roll servo 68.

The operation in the second time period occurs with the gimbal 4 locking means rendered ineffective and with the gimbal 4 freed from the craft. In the first phase, the biasing input to the servo 22 to operate the limit-stop erecting means 6, 8, 9 was provided by the inverted output of the pick-off 65. During the second phase, the input bias is provided by the output of the roll component of the gravity sensors 41, 42 of the platform which is effective to operate pitch servo 22 to drive gimbal 20 into one of the rigid stop parts 8, 9, on gimbal 25 through resilient part 6. This action applies a large torque to the gyro axis 28, to rapidly precess the gyro about roll axis 30 which in turn drives platform roll servo 68 to move the roll gimbal 4 so that axis 23 is horizontal. As the roll pick-off 67 slaves the platform gimbal 4 toward the vertical in roll, the roll liquid level component decreases thereby decreasing the pressure on spring stop 6 and hence the precession of the vertical gyro in roll. The roll gimbal slows down as it approaches the vertical and when the liquid level roll component signal becomes negligible, spring pressure ceases and the platform roll gimbal is driven at its normal erecting rate to the vertical. The second input to servo 22 in this phase is provided by the normal slaving output $\theta_{G.V.}$ of the pick-off 65 which goes to null along with $\theta_p$ as the erecting means aligns the spin axis 34 of the rotor with the axis 40 defined by the liquid levels 41, 42, thereby aligning the ring 11 of the directional gyro with the vertical.

At the end of the second phase, the timer 87 opens the circuit to relay 119 and the armature 120 is restored to engagement with contact 121 thereby rendering the start-up conditioning means ineffective. The rotors 33 and 35 are spun by means that accelerates the same from standstill to normal operating speed within a minute. The total time of the first and second phases may correspond to this time interval so that the system is operative with its components properly located when the rotors are up to normal operating speed and timer 87 cuts out.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a gyroscopic stabilization system for dirigible craft having a first gimbal carried by the craft to move about a normally horizontal axis, a first servo operatively connected to the first gimbal, a second gimbal carried by the first gimbal to move about a normally horizontal axis perpendicular to the axis of the first gimbal, a second servo operatively connected to the second gimbal, stabilizing means including a gyro vertical having a gimbal carried by the second gimbal with an axis corresponding to the axis of one of the servo gimbals, a rotor frame carried by the gyro vertical gimbal with an axis corresponding to the axis of the other of the servo gimbals, and a rotor spinning about a normally vertical axis; a directional gyro having a ring carried by the second gimbal with an axis normally in alignment with the axis of spin of the rotor of the gyro vertical, means for slaving the ring of the directional gyro about its vertical axis to a predetermined azimuthal direction, a pair of gravity sensors arranged in mutually perpendicular relation on the directional gyro ring for providing outputs depending on the tilt of the axis of the directional gyro ring from the gravity vertical, means for resolving the outputs of the sensors in accordance with said azimuthal direction, and means normally responsive to said resolved signals for slaving said gyro vertical to said gravity vertical; start-up conditioning means including first normally ineffective means for operating the first servo to lock the first gimbal to the craft, second normally ineffective means for operating the second servo depending on the angular relation between the gyro vertical gimbal and the second gimbal in an inverted sense, third normally ineffective means for operating the second servo depending on the angular relation between the gyro vertical gimbal and the second gimbal in a proper sense, fourth normally ineffective means for providing a damping input to the second servo, fifth normally ineffective means for operating the second servo in accordance with one of the outputs of the resolving means, sixth normally ineffective means for operating the second servo in accordance with the other of the outputs of the resolving means; normally ineffective aligning means including a pair of angularly spaced stops between the gyro vertical gimbal and the second gimbal engagable to exert a torque about the axis of the gimbal of the gyro vertical, and a pair of angularly spaced stops between the gyro vertical gimbal and rotor frame engagable to exert a torque about the axis of said rotor frame; means effective over an initial time period for rendering the aligning means and the first, second, fourth and fifth ineffective means effective, and means effective over a subsequent time period for rendering the aligning means and the third and sixth ineffective means effective.

2. A system of the character claimed in claim 1, including a transmitter having an output depending upon the orientation of said second servoed gimbal relative to said first servoed gimbal, and the damping input means comprises a circuit for deriving a signal in accordance with the rate of change of said transmitter output.

3. A system of the character claimed in claim 1, including a pick-off having a part fixed to the gimbal of the gyro vertical and a part fixed to the second gimbal providing an angular displacement output, and the second ineffective means is a circuit connecting the pick-off and second servo having an inverting network therein.

4. A system of the character claimed in claim 1, including a transmitter having an output depending upon the relative orientation of said first servoed gimbal relative to said craft, and the first ineffective means comprises a circuit connecting said transmitter and said first servo.

5. A system of the character claimed in claim 1, in which the respective pair of stops of the aligning means between the gyro vertical gimbal and second gimbal have respective rigid and resilient parts with an angular displacement range on the order of plus and minus one degree before engagement, and the respective pair of stops of the aligning means between the gyro vertical gimbal and rotor frame have respective rigid and resilient parts with an angular displacement range on the order of plus and minus fifteen degrees before engagement.

6. In a gyroscopic stabilization system for dirigible craft, a directional gyro having a normally vertical ring, a rotor frame carried thereby with freedom about a normally horizontal axis perpendicular to the ring axis, and a rotor spinning about a normally horizontal axis perpendicular to the axis of the rotor frame; a gyro vertical having a normally horizontal gimbal, a rotor frame carried thereby with freedom about a normally horizontal axis perpendicular to said gimbal axis, and a rotor spinning about a normally vertical axis; means for mounting the directional gyro and the gyro vertical on the craft including a first servoed gimbal having an axis corresponding to the roll axis of the craft, a second servoed gimbal carried by the first servoed gimbal having an axis corresponding to the pitch axis of the craft with the directional gyro and the gyro vertical arranged thereon with the spin axis of the gyro vertical rotor normally aligned with the vertical ring axis of the directional gyro, and gravity responsive means carried by said vertical ring and adapted to slave the gyro vertical spin axis to gravity vertical and thereby said vertical ring; start-up conditioning means including servo means operatively connected to the roll servoed gimbal, servo means operatively connected to the pitch servoed gimbal; normally ineffective aligning means including a pair of angularly spaced stops between the gyro vertical gimbal and said pitch servoed gimbal engageable to exert a torque about the axis of the horizontal gimbal of the gyro vertical, and a pair of angularly spaced stops between the horizonal gimbal and rotor frame of the gyro vertical engageable to exert a torque about the axis of the rotor frame of the gyro vertical; first means effective over an initial time period for operating the roll servo means to lock the roll servoed gimbal in fixed relation to the craft and means including said gravity responsive means for operating the pitch gimbal servo to render the aligning means effective to engage the stops between the gyro vertical horizontal gimbal and the pitch servoed gimbal and the stops between the gyro vertical horizontal gimbal and rotor frame to precess the spin axis of the rotor of the gyro vertical toward alignment with the vertical ring axis of the directional gyro; and second means including said gravity responsive means effective over a subsequent time period for rendering the locking means ineffective and for operating the pitch gimbal servo means to render the aligning means effective to engage the stops between the gyro vertical horizontal gimbal and pitch servoed gimbal whereby to precess the the spin axis of the rotor of the rotor frame of the gyro vertical about the roll axis thereof into alignment with the axis of the ring of the directional gyro.

7. A system of the character claimed in claim 6, including means for slaving the ring of the directional gyro about its vertical axis to a predetermined direction, and said gravity responsive means includes a pair of gravity sensors arranged in mutually perpendicular relation on the directional gyro vertical ring for providing outputs depending on the tilt of the axis of the directional gyro ring from a vertical condition, and means for resolving the outputs of the sensors into pitch and roll components with relation to said predetermined direction, and the pitch gimbal servo operating means in the subsequent time period includes a circuit for operating the pitch servo in accordance with the roll component of output of said resolving means.

8. In a gyroscopic stabilization system for dirigible craft having a first gimbal means an axis corresponding to the roll axis of the craft, a second gimbal means carried by the first gimbal means having an axis corresponding to the pitch axis of the craft; a gyro vertical having a gimbal carried by the second gimbal means with a normally horizontal axis parallel to the pitch axis, a rotor frame carried by the gyro vertical gimbal having freedom about a normal horizontal axis perpendicular to the gimbal axis of the gyro vertical and a rotor spinning about a normally vertical axis, and means including gravity responsive means carried by said gimbal means for normally slaving said gyro vertical rotor spin axis to the gravity vertical; start-up conditioning means including normally ineffective means for initially erecting the rotor axis of the gyro vertical having first angularly spaced stops between the gyro vertical gimbal and the second gimbal means engageable to exert a torque about the axis of the gimbal of the gyro vertical, and second angularly spaced stops between the gyro vertical gimbal and rotor frame engageable to exert a torque about the axis of the gyro vertical rotor frame; means effective over an initial time period for locking the first gimbal means to the craft and including means responsive to said gravity responsive means for moving the second gimbal means to render both said erecting means effective, and means effective over a subsequent time period for rendering the locking means ineffective and including means responsive to said gravity responsive means for moving the second gimbal means to subsequently render said first erecting means effective.

9. A system of the character claimed in claim 8, including a directional gyro having a normally vertical ring carried by the second gimbal means, a rotor frame carried by the directional gyro ring having freedom about a normally horizontal axis and a rotor spinning about a normally horizontal axis perpendicular to the horizontal frame axis.

10. A gyroscopic combination including a base, a first gimbal mounted on the base having a normally horizontal axis, a second gimbal carried by the first gimbal having freedom about a second normally horizontal axis perpendicular to the axis of the first gimbal; a gyro vertical with a gimbal having a normally horizontal axis parallel to the axis of the second gimbal carried by the second gimbal, a rotor frame having a normally horizontal axis perpendicular to the gyro vertical gimbal axis and a rotor spinning about a normally vertical axis; normally ineffective means for erecting the axis of the rotor of the gyro vertical under start-up conditions including a first pair of angularly spaced stops for limiting the motion between the gyro vertical gimbal and the second gimbal and a second pair of angularly spaced stops for limiting the motion between the gyro vertical gimbal and rotor frame; means for rendering said erecting means effective over an initial time period with the first gimbal locked to the base, and means for rendering said erecting means effective over a subsequent time period with the first gimbal free of the base.

11. A combination of the character claimed in claim 10, in which the means for rendering the erecting means effective over the initial time period includes a pick-off with a part connected to the gyro vertical gimbal and a part connected to the second gimbal having a displacement output, means for inverting the output of the pick-off having an output and a servo responsive to the output of the inverting means for moving the second gimbal.

12. A combination of the character claimed in claim 10, in which the means for rendering the erecting means effective over the subsequent time period includes vertical reference means having a displacement output depending on the tilt of the first gimbal with respect to gravity, and a servo responsive to the output of the reference means for moving the second gimbal.

13. In a gyroscopic reference system for maneuverable craft having
 (a) directional reference means supported on said craft in first roll and pitch gimbals for freedom about the craft roll and pitch axes,
 (b) a vertical gyro supported on said first pitch gimbal in second roll and pitch gimbals for freedom about corresponding roll and pitch axes,
 (c) servo means including roll and pitch servo motors for driving said first roll and pitch gimbals coupled between said second and first roll and pitch gimbals for normally slaving the latter to the former whereby to stabilize said directional reference means relative to the craft roll and pitch axes,
 (d) gravity responsive means carried by said directional reference means for supplying signals proportional to the roll and pitch components of the gravity vertical, said signals being coupled with said vertical gyro for slaving the latter to the gravity vertical,
 (e) means for quickly conditioning said reference system for operation during two sequenced time periods comprising
  (1) means operable during the first of said periods for effectively locking said first roll gimbal to said craft roll axis and for coupling said pitch component signal to said pitch gimbal servo for initially erecting the latter in pitch,
  (2) resilient limit stop means between said first and second pitch gimbals for simultaneously erecting said vertical gyro in pitch with said first pitch with said first gimbal, and
  (3) means operable during the second of said periods for releasing said first roll gimbal, for establishing normal slaving of said first gimbals to said vertical gyro, for slaving said vertical gyro to said gravity reference means, and for additionally supplying said roll component signal of the gravity reference means to said pitch gimbal servo for driving said first pitch gimbal into said resilient stop means and thereby precessing said vertical gyro roll gimbal in a direction to reduce said roll component signal whereby to erect said first and second gimbals to the gravity vertical.

References Cited

UNITED STATES PATENTS

| | | | |
|---|---|---|---|
| 2,771,779 | 11/1956 | Schaffer et al. | 74—5.34 |
| 3,068,706 | 12/1962 | Lankow | 74—5.34 |
| 3,220,266 | 11/1965 | Jurman et al. | 74—5.34 |

FRED C. MATTERN, Jr., *Primary Examiner.*

J. D. PUFFER, *Assistant Examiner.*